June 23, 1964 H. R. WENGEN 3,138,657
SPLICE INSULATING SYSTEM
Filed July 27, 1962 3 Sheets-Sheet 1
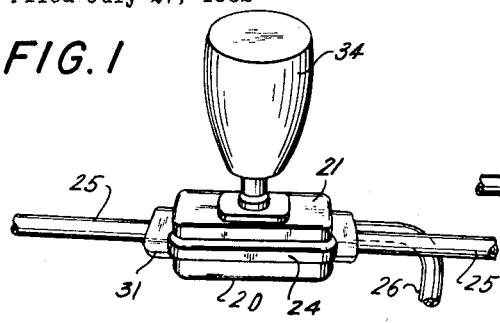
FIG. 1
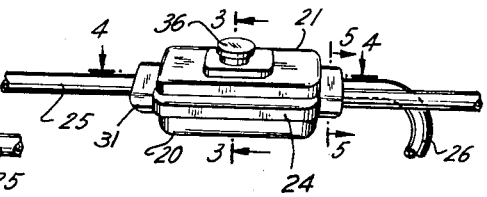
FIG. 2
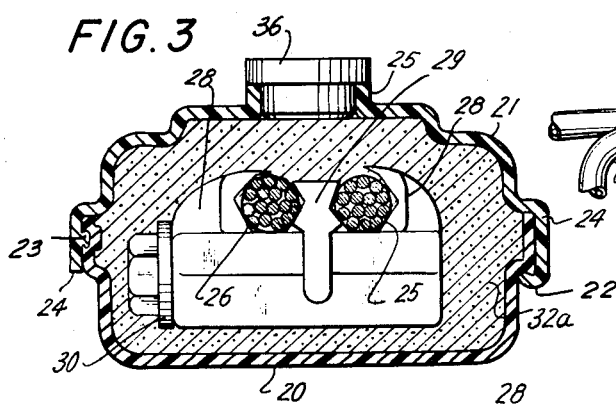
FIG. 3
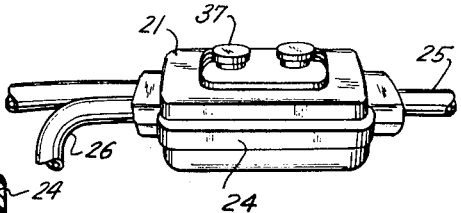
FIG. 2a
FIG. 4
INVENTOR.
HENRY R. WENGEN
BY
Kane, Dalsimer and Kane
ATTORNEY June 23, 1964 H. R. WENGEN 3,138,657
SPLICE INSULATING SYSTEM
Filed July 27, 1962 3 Sheets-Sheet 2

INVENTOR.
HENRY R. WENGEN
BY
Kane, Dalsimer and Kane
ATTORNEYS

United States Patent Office 3,138,657
Patented June 23, 1964

3,138,657
SPLICE INSULATING SYSTEM
Henry R. Wengen, Poughkeepsie, N.Y., assignor to Fargo Mfg. Company, Inc., Poughkeepsie, N.Y., a corporation of New York
Filed July 27, 1962, Ser. No. 212,940
4 Claims. (Cl. 174—92)

This invention relates to a structurally and functionally improved connector box primarily intended for application to electrical cables at points where a tap-off or connection with another cable is effected.

It is a primary object of the invention to provide an assembly incorporating adequate insulating factors that can be used on power utility distribution cables operating, for example, in the voltage range of 5 kv. to 23 kv. Obviously, however, the structure may also be employed in association with connections or tap-offs where power factors of lesser values are involved.

An additional object is that of designing and encasing a structure which may properly and expeditiously be employed by a linesman of ordinary skill to furnish an assembly which will guard against electrical leakages and corona effects as well as against corrosion; the structure having an effective life far beyond that ordinarily existing at tap-off and other connections as heretofore provided.

A still further object is that of providing a connector box assembly which will include relatively few parts of inexpensive and readily usable design which may be stored for indefinite periods of time without detriment and which will be instantly available for use.

With these and other objects in mind reference is had to the attached sheets of drawings illustrating practical embodiments of the invention and in which:

FIG. 1 is a perspective view of sections of electrical cables and showing a connector box mounted thereon and in process of manipulation to provide a complete assembly;

FIG. 2 is a similar view of the complete assembly;

FIG. 2a is a view similar to FIG. 2, but showing an alternative form of structure;

FIG. 3 is a transverse sectional view in enlarged scale taken along the line 3—3 in the direction of the arrows as indicated in FIG. 2;

FIG. 4 is a similar sectional plan view taken along the line 4—4 in the direction of the arrows as also indicated in FIG. 2;

Figure 5:
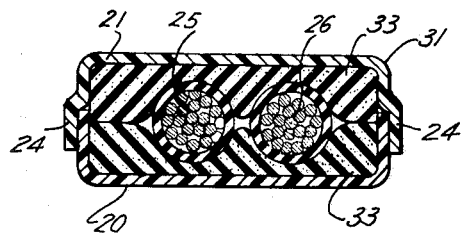
FIG. 5 is a view similar to FIG. 3, but taken along the line 5—5 in the direction of the arrows of FIG. 2.

The assembly will in all instances include a casing structure. This may take one of a number of different forms. According to a preferred concept the structure includes, as in FIGS. 1 through 5, a base 20 and a cover 21. These are preferably permanently connected by a suitable hinge, as indicated at 22; and a detent 23 serving to maintain the cover in applied position with respect to the base. It is apparent that the hinge, or similar coupling, and the detent might embrace manifold different designs according to the needs or desirability of the type installation involved. In all instances, it is preferred that the cover have portions 24 overlapping the base to thus provide for what might be termed an umbrella effect in the side edges of the casing. Also, while diverse materials could be utilized to provide the components of the casing structure, it is preferred to employ polyethylene of a thickness such that exterior pressures on the casing will result in flexing of portions of the same for purposes hereinafter brought out. All, or parts, of the casing structure may be sufficiently transparent so that the interior of the casing or box may be observed.

As in FIGS. 1, 2 and 2a, the assembly is conveniently mounted upon a cable 25, from which a tap-off 26 extends. To connect the parts, and as shown especially in FIG. 4, cable 25 may have its insulating layer or layers removed throughout a zone as at 27. Similarly, the end of tap-off cable 26 may be bared. The metallic cable areas thus exposed are adequate to accommodate the jaws of a clamp. The clamp may be of any proper design and include, for example, outer jaws 28, between which there is disposed a metallic separator strip 29; the two cables being interposed in the respective spaces between the jaws to either side of the separator strip. A bolt head 30 serves to draw the jaws towards each other so that a proper electrical conneciton is established between the cables. The dimensions of the casing structure are such as to provide adequate space for the accommodation of the clamp as well as the cables which are to extend in its interior. As shown in FIG. 4, the ends of the casing structure are preferably reduced as at 31 to furnish openings of somewhat restricted area for the accommodation of the cables.

In lieu of a clamp of this type a compression connector as shown in a prior United States patent to Becker, et al., No. 2,884,478 of April 28, 1959, might conveniently be employed. If instead of a tap-off connection an end-to-end cable splice is involved, then a connector as in U.S. patent to Wheaton, et al., No. 3,036,147 of May 22, 1962, is properly usable. Locating pins 30′ of insulating material may extend from base 20, cover 21, or both, to retain the clamp or connector in a centered position within the casing.

It is intended to subdivide the encasing structure into a central compartment with adequate space for the accommodation of the connector clamp and end compartments. To achieve this, resilient walls indicated by the numerals 32 and 33 are provided within; the casing structure. These walls are formed of foam rubber, or similar material. Polyurethane of either open or closed cell construction is a desirable substance. The open cell construction is preferred in that greater resiliency results. Also, by coating the surfaces of the walls with a water repellent material, or by impregnating their bodies with such material a desirable and effective moisture seal is provided. Walls 32 and 33 are secured to the inner faces of the base and cover sections of the enclosure. Such securing may be effected by any suitable means such as by an adhesive. The height of the walls is such that with the cover applied to the base, their free edge portions engage and may even be under slight compression. Walls 32 are disposed in zones adjacent the ends of the casing structure and well outward of the bared area 27 of cable 25. Walls 33 are mounted in the neck of end portions of the casing structure.

Accordingly, with the casing in applied position on the cables the edges of the walls will be compressed in line with those cables and the effectiveness of the seal provided by the casing structure at these points will be impaired. To overcome difficulties in this connection, a potting compound 32a of a flowable nature is employed. This compound may involve various formulations. It should be fluid enough to seek out all existing voids. It should include a high insulating factor and embrace materials acting as a corrosion inhibitor or sealant protecting the surfaces, especially if different type metals are included in the tap-off connection. By filling all voids no ozone formation will occur. Therefore, no corona effect will result. This compound fills the central partition of the encasing structure between walls 32. No water can enter the casing due to the cover overlapping the base.

The compound is designed to be air cured. It can be disposed within the casing prior to the lineman's use. Preferably he will fill the casing with this compound at the time of creating the joint. A flexible container 34 filled with a suitable quantity of compound and capable of being coupled to an inlet opening in the cover 35 may be used. That opening is normally sealed by any suitable type of closure 36. As shown in FIG. 2a, a second opening 37 may be provided in the upper surface of the cover. By removing the closures from both of these openings and applying a receptacle, not shown, to one of the same, the second will serve as a vent and observation opening whereby the user may be constantly aware of the depth of potting material which he is creating within the casing structure.

By flexing the casing wall the material is caused to fill all voids and completely surround the tap-off area of the cables so that within their bared zones they and the clamp will in effect be floating in the body of the compound. That compound will also close off the spaces between the adjacent surfaces of the cables and walls 32 as in FIG. 3. A certain amount of the compound may, without detriment, spill into the spaces existing between adjacent walls 32 and 33. As afore brought out, the bodies of walls 33 may be impregnated with, or their surfaces coated, water repellent material. Also their edges may be conformed generally to the contours of the cables so that a seal of maximum effective value is created. As will be understood, at the time the potting compound is introduced all of the critical surfaces of the tap-off connection are exposed within the central compartment of the housing with free air space between them and the cover. Therefore, an operator will have no difficulty in completely filling all voids and, as in FIG. 3, filling the casing structure to a point where in effect a reserve of compound exists within the bulged area of the cover.

Figure 6:
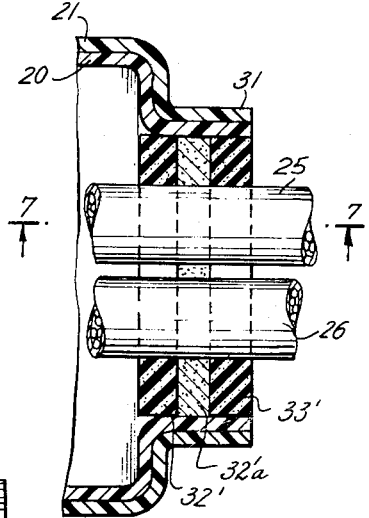
FIG. 6 is a fragmentary sectional view through one end of the casing structure.
Figure 7:
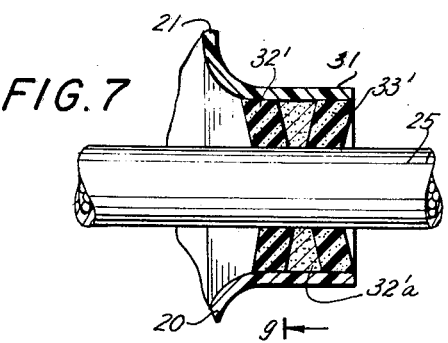
FIG. 7 is a similar sectional view taken along the line 7—7 in the direction of the arrows as indicated in FIG. 6.

In the structure as just described in connection with FIGS. 1 to 5, the width of walls 32 and 33 is relatively great in comparison with the height of the walls. Consequently, the sealing area defined by the edges of the walls adjacent the cables will be quite effective. This area of sealing, as in FIGS. 6 and 7, may be somewhat reduced as indicated in FIGS. 6 and 7, in which relatively narrow walls have been indicated at 32' and 33'. The space between these walls may be filled with a water repellent substance embracing, for example, grease, as indicated at 32'a. As will be apparent by slightly shifting the casing structure after closing the cover, these walls will define between them a keying recess which will assure a zone of sealing with ample reserve material to maintain that zone throughout the effective life of the enclosure.

Figure 8:
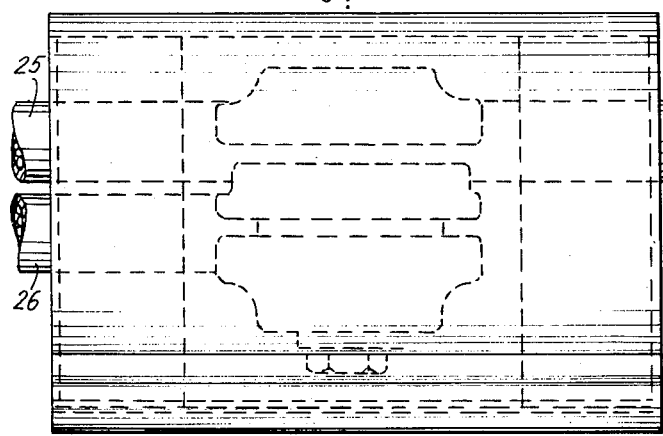
FIG. 8 is a plan view of a form of connector box alternative to those shown in the preceding views.
Figure 9:
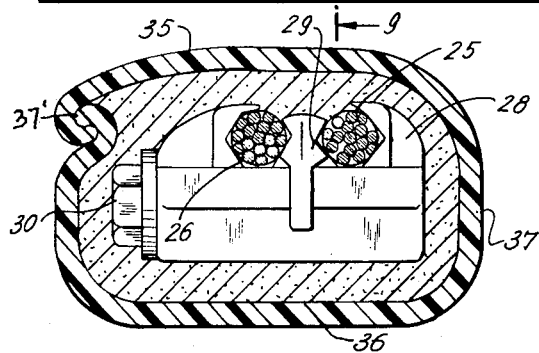
FIG. 9 is a transverse sectional view taken along the line 9—9 in the direction of the arrows as indicated in FIG. 8.

As in FIGS. 8 and 9, a casing structure may be provided by an extruded box body again formed of a suitable plastic such as polyethylene. It will include a cover portion 35, integral with a base portion 36; the two being connected by a side wall 37 which will incorporate flexibility such that the cover may readily be swung to a position exposing the interior of the casing structure for disposing the latter around the tap-off connection. In this instance, a latch or detent assembly indicated at 37', may secure the parts in position. The casing structure may be pre-filled with potting compound or else by an expedient as shown in FIG. 1 to FIG. 2a. This compound may be introduced by the linesman. Multiple walls, as at 32-33 may be included in the assembly. Otherwise, in certain instances, single end walls will suffice.

Figure 10:
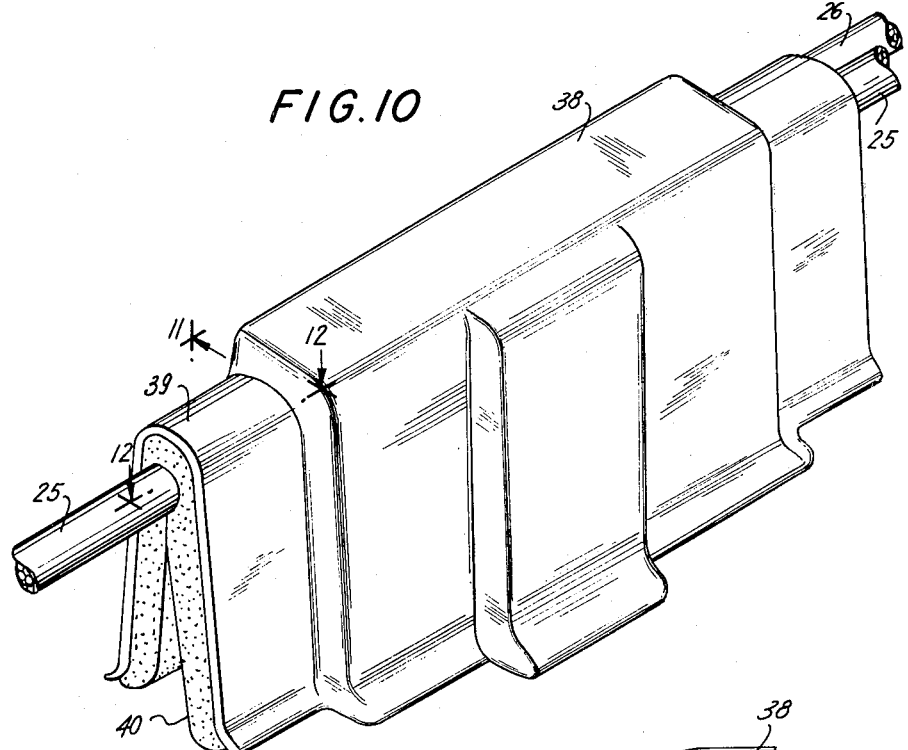
FIG. 10 is a perspective view of a still further form of box assembly within the scope of the present teachings.
Figure 12:
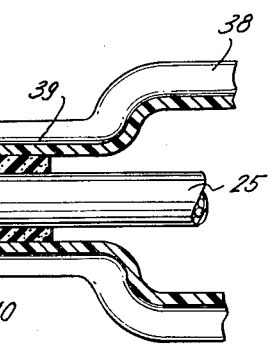
FIG. 12 is a fragmentary sectional plan view taken along the line 12—12 in the direction of the arrows as also indicated in FIG. 10.
Figure 11:
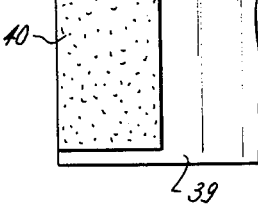
FIG. 11 is a fragmentary sectional side view taken along the line 11—11 in the direction of the arrows of FIG. 10.

A single wall structure is shown in FIGS. 10 to 12 inclusive, in which the casing structure embraces merely a cover rather than a housing completely enclosing the cables. This will include a housing 38, of generally clip-shaped, or inverted V formation and having end portions 39 of reduced area, the inner faces of which have resilient walls in the form of strips 40 applied thereto. Housing 38 will again incorporate an umbrella effect. The parts of the cable and clamp assembly may be coated with a suitable substance corresponding to the compound embraced in the previous figures. In effect, a clip structure is furnished, which a linesman, by downward pressure, may apply to the area of the tap-off connection to retain the box assembly against movement axially of the cables. The resilient walls 40 may be coated, or impregnated, with a water or moisture-repellent material. Also, the strips as shown in FIG. 10 may conform to the cable contours to assure a seal of maximum effectiveness.

In all instances it will be appreciated that the linesman will have no difficulty in establishing the assembly. More particularly, by means of a clamp or other suitable expedient, the tap-off will be provided and firm electrical contact assured between the cables. As afore brought out in the forms of the invention as described under FIGS. 1 to 9 inclusive, merely one hand of the operator will be necessary to apply the casing structure to the cables. Preferably at that time, the area of the critical surfaces and the entire compartment enclosing them will be filled with potting compound. Even a reserve of that compound will be established. All voids will be filled and electrical losses will, in effect, be eliminated. While it is preferred to employ a hinge structure adjacent of one edge of the casing structure and a detent grouping adjacent its opposite edge, separable fasteners may be employed to secure the parts of the casing structure (FIGS. 1 to 6 inclusive) against separation. The entire assembly will have a very lengthy effective life. When desired, it may readily be detached and reapplied as afore described.

As will be appreciated, the cables passing between edges of the resilient walls will tend to depress the latter. This might occur to an extent such that an opening of substantial area would exist between the seal provided by the walls and the cable surface. To minimize any such opening, or to completely eliminate it, it is preferred that the width of the resilient wall or walls be relatively great in proportion to the height thereof. Accordingly, those walls will tend to form a seal annulus at least around an adequate zone of the cable. Walls which are generally proportional in this connection have been shown in FIG. 4 (numerals 32 and 33), FIG. 8 and FIGS. 11 and 12.

Thus, among others, the several objects of the invention as specifically aforenoted are achieved. Obviously, numerous changes in construction and rearrangements of the parts might be resorted to without departing from the spirit of the invention as defined by the claims.

I claim:
1. An electrical connector box for connecting electrical cables comprising in combination a casing structure, first and second open end portions formed in said casing electrical cables projecting through said open end portions, clamp means within said casing receiving and connecting said electrical cables, first and second walls provided respectively in said open end portions formed of a material which is more resilient than said casing, said walls respectively having said cables projecting therethrough and each wall sealingly embracing said cable passing therethrough, a potting compound substantially confined within said box by said casing and said end walls, a third wall in said first open end portion spaced from said first wall and outwardly thereof, a fourth wall in said second open end portion spaced from said second wall and outwardly thereof, said first and second walls being porous with the space between said first and third walls and said second and fourth walls being formed to receive such of said potting compound which passes through said first and second walls respectively.

2. A box as defined in claim 1, said casing structure comprising a relatively movable base and cover integrally connected to each other and means for securing said cover against movement with respect to said base.

3. In a box as defined in claim 2 in which retaining means are provided to retain said clamp means in a centered position within the box.

4. A box as defined in claim 3 in which said retaining means consists of locating pins of insulating material extending within said box from said casing.

References Cited in the file of this patent

UNITED STATES PATENTS

| | | |
|---|---|---|
| 2,267,630 | Weiland | Dec. 23, 1941 |
| 2,333,266 | Miller | Nov. 2, 1943 |
| 2,750,573 | Mika | June 12, 1956 |
| 2,894,056 | Bogese | July 7, 1959 |
| 2,922,836 | Brown | Jan. 26, 1960 |
| 2,943,140 | Bender | June 28, 1960 |
| 3,054,849 | Colbert | Sept. 18, 1962 |

OTHER REFERENCES

Dossert: "The Dossert . . . Triplex," advertisement published in Electrical World, Aug. 28, 1961, page 69 relied on. Copy in the Scientific Library.